Jan. 20, 1959   C. J. SCRANTON   2,869,711
MEANS FOR MOUNTING PICKUP FINGERS ON DRAPER CONVEYER
Filed Nov. 20, 1953
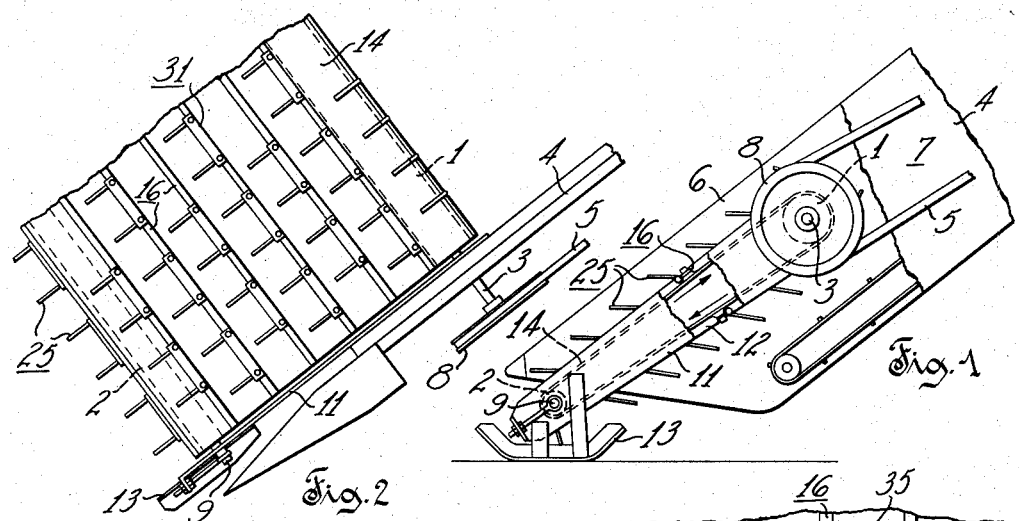
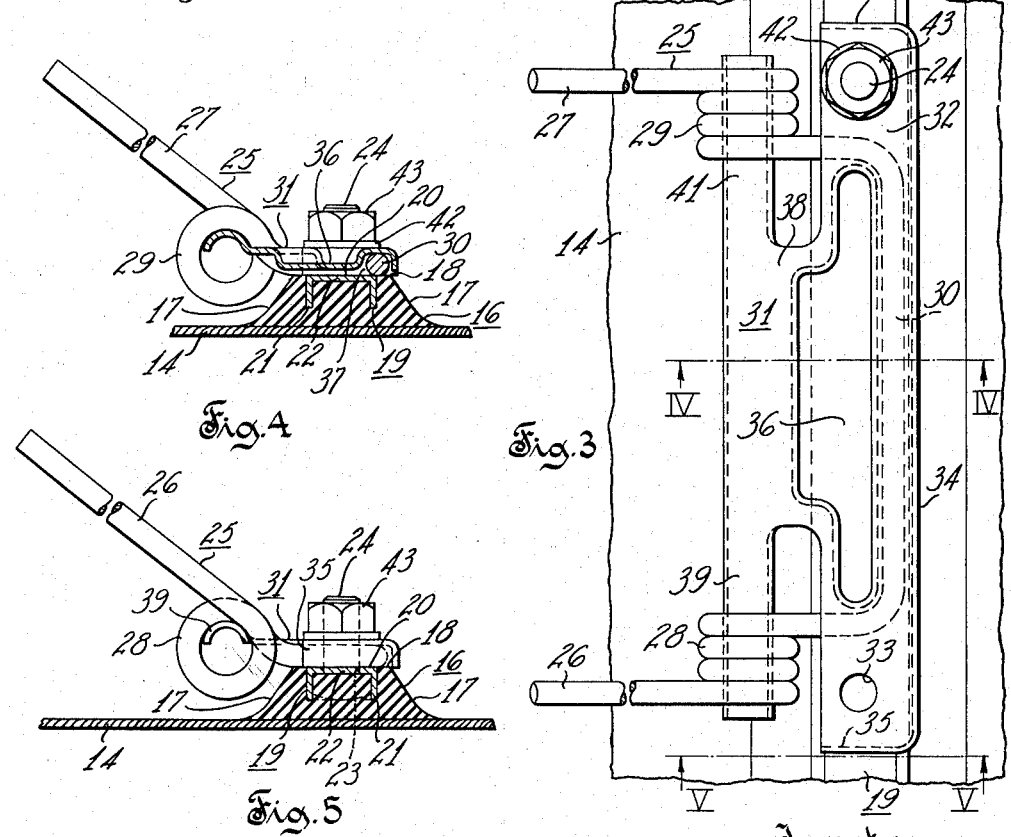
Inventor
Charles J. Scranton
By Kenneth Buckles
Attorney United States Patent Office 2,869,711
Patented Jan. 20, 1959

2,869,711

MEANS FOR MOUNTING PICKUP FINGERS ON DRAPER CONVEYER

Charles J. Scranton, La Porte, Ind., assignor to Allis-Chalmers Manufacturing Company, Milwaukee, Wis.

Application November 20, 1953, Serial No. 393,276

3 Claims. (Cl. 198—198)

The present invention relates generally to means for securing and supporting spring tooth members on an endless conveyer belt of a windrow pickup device.

It is an object of this invention to provide securing means for spring tooth members which is simple and inexpensive to manufacture, and which efficiently secures a pickup toothed member to a slat of a conveyer belt and prevents the coil portions of the toothed member from wearing into the belt but at the same time permits free springing of the teeth when obstacles are encountered in operation.

A further object of this invention is to provide a coiled spring tooth member and means for mounting same on a slat of a conveyer belt and wherein the tooth member and mounting means are readily combinable with the slat and wherein a free flexure of the coil is provided.

A further object of this invention is to provide means for mounting pickup fingers on a draper conveyer and wherein such means support the coil portions of a double tine, single wire pickup finger and which means locates the pickup finger in exact desired position relative to the conveyer.

The foregoing and other objects and desirable features inherent in and encompassed by the invention will become apparent from a complete disclosure of a preferred embodiment of the invention in the following detailed description and the accompanying sheets of drawings, in which:

Fig. 1 is a side elevation of the header of a combine harvester embodying the invention with some parts broken away;

Fig. 2 is a plan view similar to Fig. 1;

Fig. 3 is an enlarged plan view of a portion of the pickup device similar to that shown in Fig. 2;

Fig. 4 is a sectional view taken on line IV—IV of Fig. 3; and

Fig. 5 is a sectional view taken on line V—V of Fig. 3.

Referring to the drawings, an embodiment of the invention is shown in Figs. 1 and 2 in the form of a pickup device attached to the forward end of a harvester header and includes upper and lower rolls 1 and 2, respectively. Upper roll 1 is attached to shaft 3 for rotation therewith, shaft 3 being journalled in sidewalls 4 and 6 of header 7. A pulley 8 is attached to one end of shaft 3 and this pulley is driven from the harvesting mechanism by a V-belt 5. The pickup device also includes a shaft 9 about which lower roll 2 is attached for rotation therewith. A pair of transversely spaced side members 11 and 12 are relatively rotatably connected at their upper ends to shaft 3 and at their lower ends provide bearings for rotatably supporting shaft 9. Also connected to the lower ends of side members 11 and 12 are shoe members 13 which ride on the ground during normal operation of the pickup device. Counterbalancing means (not shown) can be provided which supports most of the weight of the forward or lower end of the pickup device thereby permitting the forward end of the pickup device to raise and lower readily in following the contour of the ground being traversed.

An endless belt 14 encircles rolls 1 and 2 and is driven by frictional contact with roll 1. Belt 14 may be fabric, rubber or fabric impregnated with rubber or similar plastic material. In the embodiment shown belt 14 is of canvas material impregnated with rubber. At longitudinally spaced intervals on belt 14, transversely extending slats 16 which extend the width of the belt are vulcanized thereto. As illustrated in the drawings the slats are made of rubber vulcanized to belt 14, however, these slats can be made of any like plastic material, and each slat 16 has curved transversely extending sides 17 (Figs. 4 and 5) feathering down to vulcanized attachment with belt 14 from the outstanding or outer surface 18 extending generally parallel to belt 14. A channel member 19 is vulcanized to slat 16 with the flange portions 21 extending toward belt 14 but terminating in spaced relation thereto and with the outer surface 20 of web 22 of channel 19 lying in the plane of surface 18. At transversely spaced intervals on web 22, holes 23 (Fig. 5) are provided through which the shanks of bolts 24 extend. The heads of bolts 24 are nonrotatably retained between flanges 21 of channel 19 and the inner surface of web 22. The heads of bolts 24 are larger than holes 23 thereby preventing the bolts from being pulled out of channel 19 when tension is applied to the bolts.

Spring tooth members 25 are preferably made of one piece of spring wire fabricated into a structure presenting two pickup fingers 26 and 27 with these fingers extending tangentially from their respective coil portions 28 and 29 which are coaxial and are joined by a generally transversely extending connecting portion 30. The connecting portion 30 forms the bight of a generally U-shaped midsection of the spring wire structure 25, and in the assembled condition of the parts, as shown in Figs. 3, 4 and 5, said U-shaped midsection is disposed in parallel, contacting relation to the flat top surface of its associated slat member 16, and the coiled sections 28, 29 at the opposite ends, respectively, of the U-shaped midsection are disposed in spaced, confronting relation to the trailing side surface 17 of the associated slat member.

A spring tooth member securing element 31 is utilized to fasten tooth members 25 to channel 19. Element 31 is provided with a body portion 32 in the form of an elongated plate section which extends lengthwise of the associated slat member in overlying and contacting relation to the U-shaped midsection of the associated spring wire structure 25. Opposite end portions of the plate section 32 extend lengthwise of the slat member 16 substantial distances, respectively, beyond the underlying midsection of the wire structure 25. Formed in the end portions of the plate section 32 are a pair of holes 33 (Fig. 3) transversely spaced apart a distance substantially equal to the spacing between bolts 24 and the spacing between fingers 26 and 27. These holes are of a size to receive the shanks of bolts 24. Body portion 32 is provided at its leading edge with a turned over portion 34 extending inwardly a distance slightly less than the diameter of the wire used in fabricating tooth member 25. Between holes 33, body portion 32 is provided with a depressed central portion 36. This portion 36 is depressed a distance slightly less than the diameter of the wire utilized in fabricating tooth member 25. The leading edge of portion 36 extends generally parallel to turned over portion 34 and forms therewith a channel or trough 37 (Fig. 4) adapted to straddle bight portion 30 of tooth member 25. The leading edge of portion 36 is separated from turned over portion 34 by a distance slightly greater than the wire diameter of tooth member 25. Body portion 32 is also provided with inwardly extending transverse end portions 35 (Figs.

3 and 5) which extend from body portion 32 a distance slightly less than diameter of the wire utilized in fabricating tooth member 25.

Body portion 32 is provided wtih a longitudinally extending lagging portion 38 provided with a pair of oppositely transversely extending arms 39 and 41 which have their upper or outer surfaces arcuately configured substantially complementary to and in radial load transmitting engagement with the inner surfaces of coils 28 and 29, respectively.

Portion 38 is of a transverse width of small enough size and arms 39 and 41 extend sufficiently so that when securing element 31 is detached from the slat 16, spring tooth member 25 can be mounted on element 31 by sliding coil 28 over arm 39 while coil 29 is sliding adjacent to arm 41. This sliding process is then continued until coil 28 contacts lagging portion 38, at this time tooth member 25 is pivoted about coil 28 until the open portion of coil 29 is aligned with arm 41. Then member 25 is slid transversely in a direction opposite to the original sliding until arms 39 and 41 are in coils 28 and 29, respectively. Tooth member 25 is then pivoted about the common axis of coils 28 and 29 until connecting member 30 has been seated in trough 37. In other words, the arms 39 and 41 extend lengthwise of the slat member 16 in opposite directions from a midportion 38 of the plate section of the securing element 31 and afford sufficient axial clearance for the coiled sections 28 and 29 so that upon separation of the fastening means represented by bolts 24 and nuts 43, the arms 39 and 41 will be movable axially into and out of the coiled sections 28 and 29, respectively, by relative back and forth movement of the wire structure 25 and securing element 31 axially and transversely of said coiled sections. After the wire structure 25 and securing element 31 have been assembled by positioning of the arms 39 and 41 in the coiled sections 28 and 29, respectively, the completed assembly may then be mounted on slat 16 by passing holes 33 over bolts 24. Lock washers 42 and nuts 43 are then engaged with bolts 24 and tightened down against securing element 31 thereby clamping the U-shaped midsection of wire structure 25 and turned over portions 35 against the upper surface of web 22.

From the foregoing it is seen that spring tooth members 25 can readily be attached to the pickup device and in the event of breakage can be just as readily detached by following the above steps in reverse.

It is to be noted that arms 39 and 41 act as supports for coils 28 and 29, respectively, and permit a free flexure of the coils while at the same time preventing any destructive contact of the coils with belt 14 or slats 16. By supporting the coils away from contact with the belt or slat, wear between the coils and belt or slat is eliminated. And because the coils are free to flex about the arcuate upper surfaces of the arms, an overstressing of the rigid fastening portion 30 between coils 28 and 29 is eliminated thereby reducing the amount of finger breakage.

It is to be noted that both end portions 35 of securing element 31 and spring tooth connecting member 30 are clamped against the outer web surface of channel member 19, thereby providing a rigid attachment between member 30 and channel member 19 but because channel member 19 is vulcanized to rubber slat 16 there is an inherent amount of flexibility between spring tooth member 25 and belt 14 which prolongs the useful life of spring tooth members 25, belt 14 and slats 16.

While it has previously been stated that turned over portions 35 extend inwardly a distance slightly less than the wire diameter of spring tooth member 25, when nuts 43 are tightened down on securing element 31 a slight deformation of element 31 occurs which results in portions 35 contacting web surface 20. As is shown in Fig. 5, turned over portions 35 are the only parts of securing element 31 which come into contact with channel member 19.

It is to be understood that it is not desired to limit the invention to the particular features and details described hereinabove and that the invention is to be considered as including such other forms and modifications as are fairly within the scope of the appended claims.

It is claimed and desired to secure by Letters Patent:

1. In combination in a windrow pickup device comprising a longitudinally extending endless conveyer having transversely extending slats vulcanized to the outer surface of said endless conveyer, and a spring tooth member having a pair of transversely spaced coaxial coils and tangentially extending fingers, each of said slats including a coextensive transversely extending channel member having its legs imbedded in said slat with the outer web surface thereof being flush with the outer surface of said slat, a securing element for said tooth member comprising a body portion provided with a pair of transversely spaced apart apertures positioned on opposite sides of a depressed central portion, means passing through said apertures for attaching said body portion to said outer web surface, said central portion being depressed an amount slightly less than the wire diameter of said tooth member, said body portion being provided with a transversely extending turned over portion extending inwardly a distance slightly less than the wire diameter of said tooth member, said turned over portion extending parallel to and in longitudinally spaced relation to said central portion a distance substantially equal to said wire diameter to provide a transversely extending trough, said depressed portion including a longitudinally extending portion, a pair of transversely extending arms on opposite sides of said longitudinally extending portion and received within said coils in supporting relation thereto, said coils being provided with a transversely extending connecting portion seated in said trough and clamped by said retaining element against said outer web surface with said coils supported on said arms in longitudinally spaced relation to said slat and in outwardly spaced relation to said conveyer.

2. In combination in a windrow pickup device comprising a longitudinally extending endless conveyer, transversely extending slats vulcanized to the outer surface of said conveyer, and a spring wire tooth member having a pair of spaced coaxial coils each having a tangentially extending finger, each of said slats including a substantially coextensive channel member having its legs embedded in said slat with the outer web surface of said channel member being flush with the outer surface of said slat, a securing element for said tooth member comprising a body portion provided with a pair of apertures therethrough transversely spaced apart a distance substantially equal to the spacing between said fingers, a central depressed portion between said apertures, said channel member being provided with outwardly extending bolts transversely spaced apart the same distance as said apertures and said bolts being of a size to be received in said apertures, fastening means coacting with said bolts and with said securing element for attaching said securing element to said slat, said central portion being depressed an amount slightly less than the wire diameter of said tooth member, said body portion being provided with a leading transversely extending turned over portion extending inwardly a distance slightly less than the wire diameter of said tooth member, said turned over portion extending parallel to and in longitudinally spaced relation to the leading edge of said central portion a distance substantially equal to said wire diameter, to provide a transversely extending trough, said body portion being provided on the transverse ends thereof with inwardly extending turned over portions extending slightly less than said wire diameter, said depressed portion including a lagging longitudinally extending portion, a pair of transversely extending arms attached to opposite sides of said longitudinal portion adjacent the lagging end thereof, said arms being provided with arcuate outer surfaces received within said coils in supporting relation thereto, said coils being provided with a transversely extending connecting portion seated in said trough and clamped by said retaining element against said outer web surface with said coils supported on said arcuate surfaces in spaced lagging relation to said slat and in outwardly spaced relation to said conveyer, said transversely extending turned over portions contacting said web portion when said fastening means are tightened down on said retaining element.

3. In combination in a windrow pickup device comprising a longitudinally extending endless conveyer, transversely extending slats vulcanized to the outer surface of said conveyer, and a spring wire tooth member having a pair of spaced coaxial coils each having a tangentially extending finger, each of said slats including a substantially coextensive channel member having its legs embedded in said slat with the outer web surface of said channel member being flush with the outer web surface of said conveyer, fastening members extending outwardly from said web surface and being spaced apart a distance substantially equal to the spacing between said fingers, a securing element for said tooth member comprising a body portion provided with a pair of apertures therethrough transversely spaced apart a distance equal to the spacing between said fastening members and being of a size to receive said fastening members for attaching said element to said slat, said body portion including a central portion located between said apertures, said central portion being depressed an amount slightly less than the wire diameter of said tooth member, said body portion being provided with a leading transversely extending turned over portion extending inwardly a distance slightly less than said wire diameter, said turned over portion extending parallel to and in longitudinally spaced relation to the leading edge of said central portion a distance substantially equal to said wire diameter to provide a transversely extending trough, said body portion being provided on the transverse ends thereof with inwardly extending turned over portions extending slightly less than said wire diameter, said central portion including a lagging longitudinal portion of a transverse width less than the spacing between said coils, a pair of transversely extending arms attached to opposite sides of said longitudinal portion adjacent the lagging end thereof and being spaced from said central portion by a distance at least equal to said wire diameter, the unattached ends of said arms being spaced apart a distance slightly greater than the distance between said fingers, said arms being provided with arcuate outer surfaces received within said coils in supporting relation thereto, said coils being provided with a transversely extending connecting portion seated in said trough and clamped by said retaining element against said outer web surface with said coils supported on said arcuate surfaces in spaced lagging relation to said slat and in outwardly spaced relation to said conveyer, said transversely extending turned over portions contacting said web surface when fastening means coacting with said fastening members are tightened down on said securing element, said tooth member and said securing element being so configured and arranged that when said fastening means are removed, said tooth member and securing element are removable from said slat and said tooth member can then be removed from said securing element by effecting a relative movement thereof about the axis of said coils and then effecting a relative transverse movement thereof until one of said coils is removed from its cooperating arm and by then effecting a relative longitudinal displacement of said coil and then effecting a reverse transverse relative movement until the other of said coils is removed from the other of said arms.

References Cited in the file of this patent

UNITED STATES PATENTS

| | | |
|---|---|---|
| 1,779,720 | Wood | Oct. 28, 1930 |
| 2,305,044 | Toews | Dec. 15, 1942 |
| 2,351,144 | Oehler | June 13, 1944 |
| 2,608,046 | Best | Aug. 26, 1952 |